(12) United States Patent
Kikuchi

(10) Patent No.: US 12,513,410 B2
(45) Date of Patent: Dec. 30, 2025

(54) IMAGE PROCESSING APPARATUS, OPTICAL TRANSMISSION APPARATUS, OPTICAL COMMUNICATION SYSTEM, PROGRAM AND IMAGE PROCESSING METHOD

(71) Applicant: CASIO COMPUTER CO., LTD., Tokyo (JP)

(72) Inventor: Masaaki Kikuchi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 130 days.

(21) Appl. No.: 18/081,871

(22) Filed: Dec. 15, 2022

(65) Prior Publication Data
US 2023/0199323 A1     Jun. 22, 2023

(30) Foreign Application Priority Data
Dec. 21, 2021   (JP) ................. 2021-207493

(51) Int. Cl.
 *H04N 23/745*   (2023.01)
 *G06T 7/20*     (2017.01)
 *G06T 7/70*     (2017.01)
 *G06V 10/60*    (2022.01)

(52) U.S. Cl.
 CPC ............ *H04N 23/745* (2023.01); *G06T 7/20* (2013.01); *G06T 7/70* (2017.01); *G06V 10/60* (2022.01); *G06T 2207/10048* (2013.01)

(58) Field of Classification Search
 CPC ........ H04N 23/745; H04N 23/11; G06T 7/20; G06T 7/70; G06T 2207/10048; G06T 2207/30204; G06T 7/73; G06T 2207/10004; G06T 5/80; G06V 10/60; G06V 20/52; G06V 10/143
See application file for complete search history.

(56) References Cited

U.S. PATENT DOCUMENTS

| 11,378,694 B2 * | 7/2022 | Van Der Sijde ..... H04N 23/684 |
| 2012/0281986 A1 * | 11/2012 | Leeb ................... H04B 10/116 398/115 |

(Continued)

FOREIGN PATENT DOCUMENTS

| JP | 2000349709 A | 12/2000 |
| JP | 2002073565 A | 3/2002 |
| JP | 2005101853 A | 4/2005 |

(Continued)

OTHER PUBLICATIONS

Notice of Reasons for Refusal dated Dec. 17, 2024 for Japanese Patent Application No. 2021-207493.

(Continued)

*Primary Examiner* — Yogesh K Aggarwal
(74) *Attorney, Agent, or Firm* — Scully, Scott, Murphy & Presser, P.C.

(57) ABSTRACT

An image processing apparatus 5 is provided with a processing unit, the processing unit acquiring images 44 that are continuous over time, acquiring a position of a visible light source in a lit-up state in each of the continuous images 44, as a position of a movable body 3; and acquiring identification information about the movable body 3 based on a blinking pattern of invisible light of an invisible light source provided on the movable body 3.

9 Claims, 8 Drawing Sheets

(56) References Cited

U.S. PATENT DOCUMENTS

2016/0203369 A1\* 7/2016 Inutsuka .............. G06V 30/422
 382/113
2017/0173453 A1\* 6/2017 Huang .................... A63F 13/26

FOREIGN PATENT DOCUMENTS

| | | | |
|---|---|---|---|
| JP | 2010259015 A | 11/2010 |
| JP | 2014093700 A | 5/2014 |
| JP | 2020523752 A | 8/2020 |
| JP | 2020174272 A | 10/2020 |

OTHER PUBLICATIONS

Notice of Reasons for Refusal dated Apr. 22, 2025 received in Japanese Patent Application No. 2021-2007493.

\* cited by examiner

IMAGE PROCESSING APPARATUS, OPTICAL TRANSMISSION APPARATUS, OPTICAL COMMUNICATION SYSTEM, PROGRAM AND IMAGE PROCESSING METHOD

This application is based on and claims the benefit of priority from Japanese Patent Application No. 2021-207493, filed on 21 Dec. 2021, the content of which is incorporated herein by reference.

BACKGROUND OF THE INVENTION

Field of the Invention

The present disclosure relates to an image processing apparatus, an optical transmission apparatus, an optical communication system, a program and an image processing method.

Related Art

There is known a technique of transmitting information by causing a light source as an optical transmission apparatus to change in a predetermined lighting pattern, capturing an image of the lighting pattern with an imaging apparatus as an optical reception apparatus and analyzing the image. Japanese Unexamined Patent Application (Translation of PCT Application), Publication No. 2020-523752 discloses this kind of technique. Japanese Unexamined Patent Application (Translation of PCT Application), Publication No. 2020-523752 relates to an optical transmission apparatus using a visual-light LED (light emission device) or an infrared LED.

SUMMARY OF THE INVENTION

An image processing apparatus of one aspect of the present disclosure includes: a processor configured to acquire a plurality of images that are continuous over time; acquire, as a position of a movable body, a position of a visible light source in a lit-up state that is provided on the movable body in the plurality of images; and acquire identification information about the movable body based on a blinking pattern of an invisible light source in the plurality of images.

DETAILED DESCRIPTION OF THE INVENTION

An optical communication system 1 according to an embodiment of the present disclosure will be described below using drawings.

Figure 1:
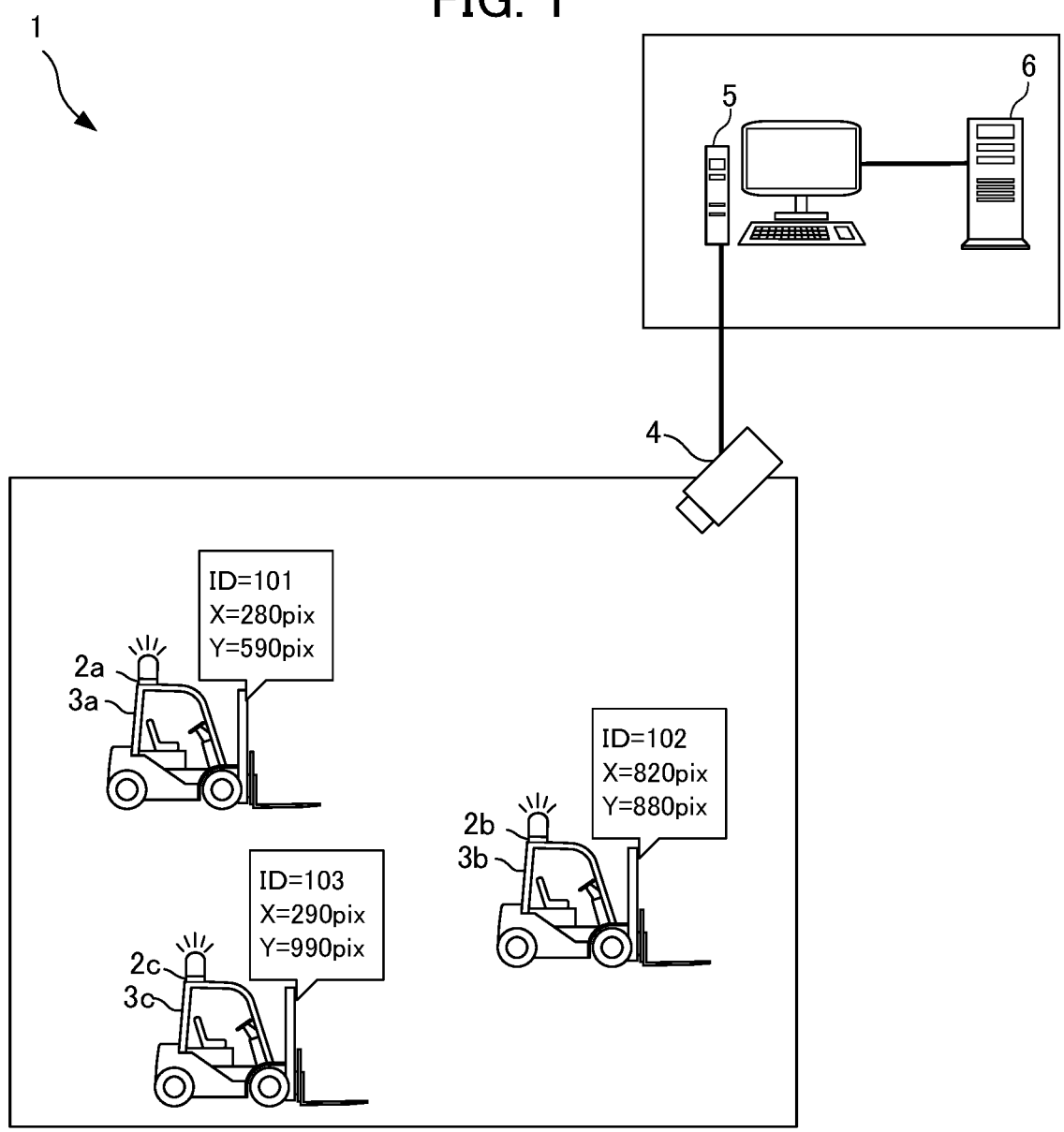
FIG. 1 is a schematic diagram showing a configuration of an optical communication system according to one embodiment of the present disclosure.

FIG. 1 is a schematic diagram showing the optical communication system 1 according to the embodiment of the present disclosure. As shown in FIG. 1, the optical communication system 1 includes LED transmission apparatuses 2, an imaging apparatus 4, an image processing apparatus 5 and a work management apparatus 6. In the present specification, the term "system" means an entire apparatus including a plurality of apparatuses, a plurality of means and the like.

The LED transmission apparatus 2 is an example of an optical transmission apparatus that uses a light source. An LED is an example of a light source. The type of the light source does not matter if it emits light. For example, a bulb, a laser or the like may be used. As light sources, visible light, which is light visible to eyes, and invisible light, which is not visible to eyes, are used. The invisible light is, for example, infrared light or ultraviolet light.

The LED transmission apparatuses 2 are optical transmission apparatuses mounted on movable bodies 3. The movable bodies 3 are, for example, forklifts. In FIG. 1, three movable bodies 3a to 3c are shown.

The LED transmission apparatus 2 of the present embodiment is configured to be capable of controlling continuous lighting of visible light for tracking, and blinking or flickering of infrared light for communication of information such as an identification number.

The LED transmission apparatus 2 causes visible light to be lit up continuously or for a predetermined period and, in parallel, converts information transmitted by optical communication to change in infrared light to emit light. Positions of the visible light sources are acquired as positions of the movable bodies 3, and pieces of information based on infrared lights, which are invisible lights, are acquired. The pieces of information transmitted by optical communication are, for example, pieces of identification information about the movable bodies 3. The LED transmission apparatuses 2a to 2c in FIG. 1 are arranged on the movable bodies 3a to 3c, respectively, and transmit different pieces of identification information, respectively, by optical communication.

The imaging apparatus 4 is arranged at a position capable of capturing an image of movements of the movable bodies 3. For example, the imaging apparatus 4 is a digital camera. The imaging apparatus 4 captures a plurality of images 44 that are continuous over time (video). In the example shown in FIG. 1, the imaging apparatus 4 has the number of pixels of FHD (full high definition) (1920 pixels (pix) in X direction and 1080 pixels (pix) in Y direction). Identification numbers (IDs) of the three movable bodies 3 (forklifts) and positions on an image shot by the imaging apparatus 4, which are indicated by positions of pixels, are shown. For example, as for the movable body 3a at the upper left in the drawing, it is identified that the identification number (ID) is 101, and a position in the X direction is the 280-th pixel among the 1920 pixels and a position in the Y direction is the 590-th pixel among the 1080 pixels.

The image processing apparatus 5 is an information processing apparatus that tracks positions of visible light LEDs 29 lit up continuously or for a predetermined period, on images and analyzes blinking or flickering patterns of infrared LEDs 30 blinking or flickering at the same positions as the visible light LEDs 29. The reason why the imaging apparatus 4 is used as an optical reception apparatus is that it is possible to acquire pieces of information from the LED transmission apparatuses 2, from a plurality of positions at the same time, and convert positions of the LED transmission apparatuses 2 on images to actual position coordinates to analyze positions of the movable bodies 3 as shown in FIG. 1.

The visible light LED 29 is an example of a visible light source that emits visible light. The type of the light source does not matter if it emits visible light. For example, a bulb, a laser or the like may be used. The infrared LED 30 is an example of an infrared light source that emits infrared light. The type of the light source does not matter if it emits infrared light. For example, a bulb equipped with an infrared filter, an infrared laser or the like may be used.

The work management apparatus 6 is a host computer that analyzes work situations and carriage of luggage carried by the movable bodies 3 based on a result of analysis of movements of the movable bodies 3. Though the work management apparatus 6 is configured being separated from the image processing apparatus 5 in FIG. 1, the work management apparatus 6 and the image processing apparatus 5 may be configured with one computer or with three or more computers.

Figure 2:
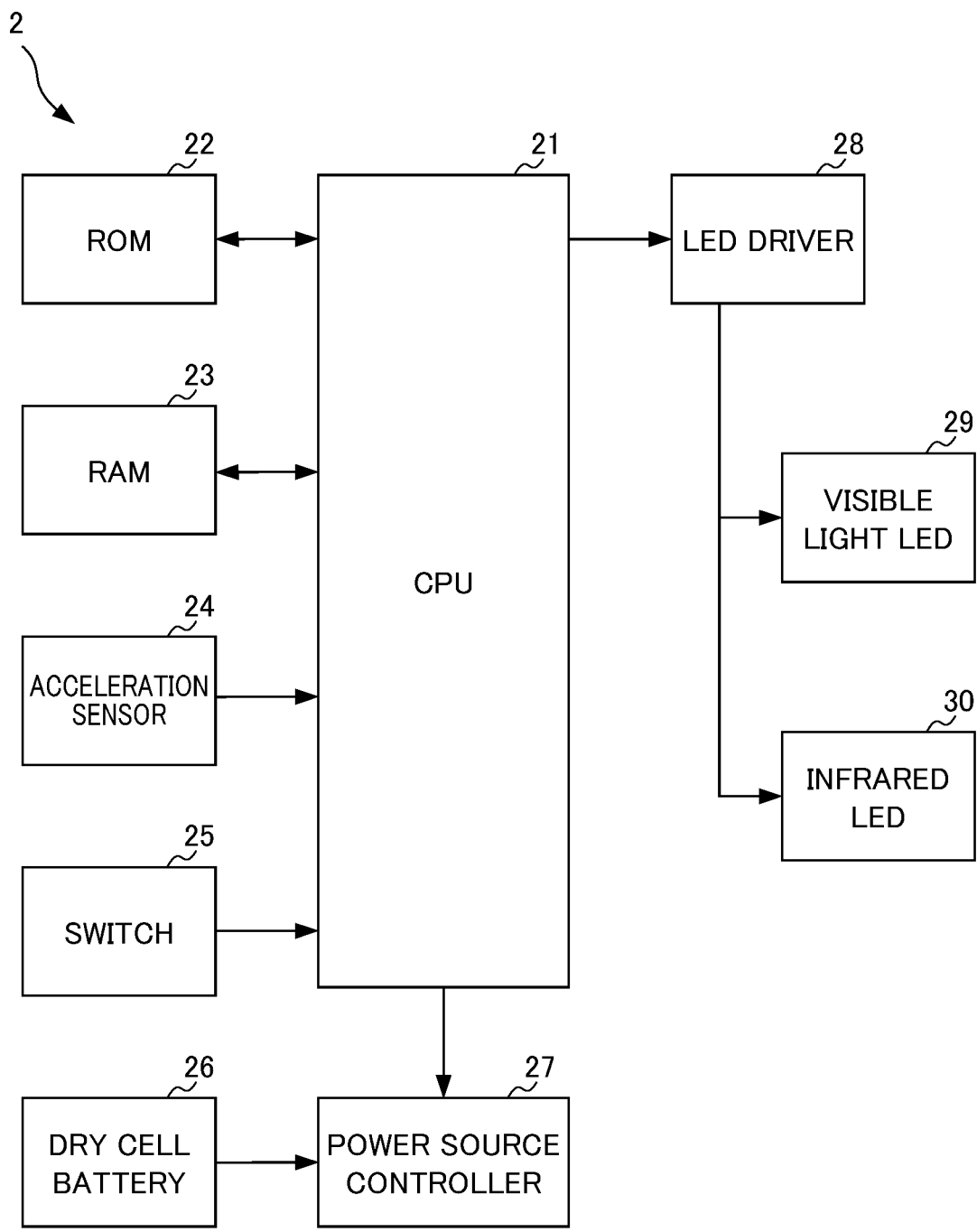
FIG. 2 is a block diagram showing a hardware configuration of each LED transmission apparatus of FIG. 1.

Next, an example of a hardware configuration of each LED transmission apparatus 2 will be described with reference to FIG. 2. FIG. 2 is a block diagram showing the hardware configuration of each LED transmission apparatus 2 of FIG. 1. As shown in FIG. 2, each LED transmission apparatus 2 is provided with a CPU 21, a ROM 22, a RAM 23, an acceleration sensor 24, a switch 25, a dry cell battery 26, a power source controller 27, an LED driver 28, the visible light LED 29 and the infrared LED 30.

The CPU 21 executes various kinds of processes according to a program recorded in the ROM 22 or a program loaded to the RAM 23. The CPU 21 is realized by a processor that executes arithmetic processing. As the processor, for example, such that is configured with a single device among various kinds of processing devices such as a single processor, a multiprocessor and a multicore processor, and, additionally, such that is obtained by combining any of the above various kinds of devices and a processing circuit such as an ASIC (Application Specific Integrated Circuit) or an FPGA (Field-Programmable Gate Array) are included.

In the RAM 23, data and the like required for the CPU 21 to execute the various kinds of processes are also appropriately stored.

The acceleration sensor 24 detects movement acceleration of the movable body 3. The switch 25 performs switching and reset of the CPU 21. The dry cell battery 26 supplies power as a power source. The power source controller 27 controls power supply to the LED driver 28 and the like.

The LED driver 28 supplies power to the visible light LED 29 and the infrared LED 30 based on an instruction by the CPU 21 and controls lighting, and blinking or flickering of the visible light LED 29 and the infrared LED 30.

The visible light LED 29 and the infrared LED 30 are arranged close to each other. Each of the visible light LED 29 and the infrared LED 30 emits light towards the surroundings, the light being refracted and scattered by the curved surface or unevenness of the cover glass. When being shown on the imaging apparatus 4, the visible light LED 29 and the infrared LED 30 are recognized as indicating a single place.

The visible light LED 29 is continuously lit up, and information is communicated using blinking or flickering of the infrared LED 30. For example, the infrared LED 30 emits a blinking or flickering pattern, which is a lighting pattern associated with the identification number of the movable body 3 based on an instruction by the CPU 21, the lighting pattern being stored in the ROM 22. By causing the blinking or flickering pattern of the infrared LED 30 to have redundancy, it becomes easy to distinguish the pattern from noise, and it becomes possible to extract information (the identification number and the like) more certainly.

Figure 3:
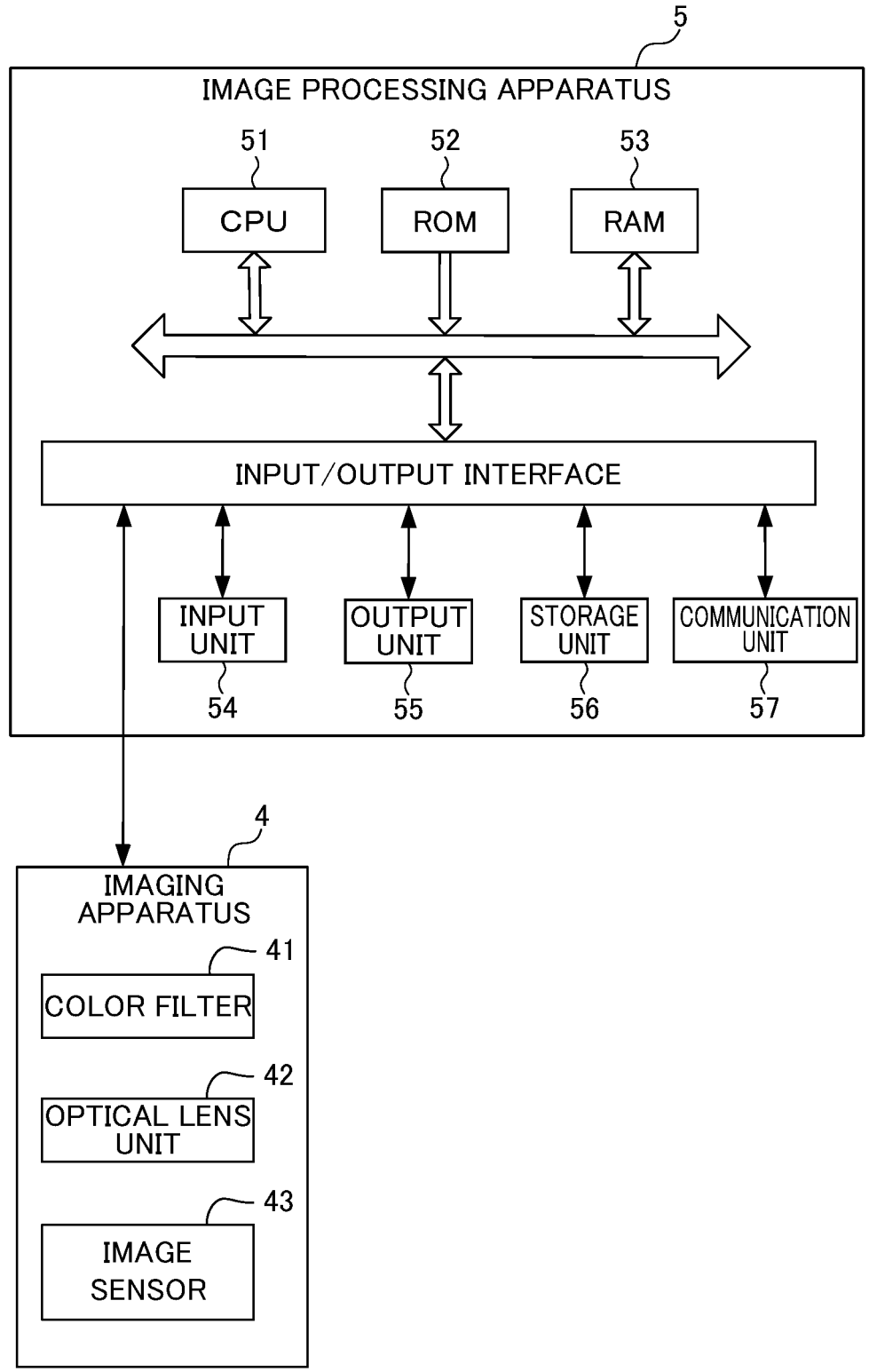
FIG. 3 is a block diagram showing hardware configurations of an imaging apparatus and an image processing apparatus of FIG. 1.

An example of the hardware configuration of the image processing apparatus 5 will be described with reference to FIG. 3. As shown in FIG. 3, the image processing apparatus 5 is provided with a CPU 51, a ROM 52, a RAM 53, an input unit 54, an output unit 55, a storage unit 56 and a communication unit 57.

The CPU 51 executes various kinds of processes according to a program recorded in the ROM 52 or a program loaded from the storage unit 56 to the RAM 53.

In the RAM 53, data and the like required for the CPU 51 to execute the various kinds of processes are also appropriately stored.

The CPU 51, the ROM 52 and the RAM 53 are mutually connected via a bus. An input/output interface is also connected to the bus. The imaging apparatus 4, the input unit 54, the output unit 55, the storage unit 56 and the communication unit 57 are connected to the input/output interface.

The input unit 54 is configured with various kinds of buttons, a microphone and the like, and inputs various kinds of information according to an instruction operation by a user. The output unit 55 is configured with a display, a speaker and the like, and outputs the images 44 and voice. The storage unit 56 is configured with a hard disk, a flash memory or the like, and stores various kinds of data of the images 44. The communication unit 57 is a network interface that controls communication performed with other apparatuses such as the work management apparatus 6 via a network including the Internet.

The imaging apparatus 4 is provided with color filters 41, an optical lens unit 42 and an image sensor 43. The image sensor 43 is a single sensor and is capable of receiving both of visible light and invisible light. The image sensor 43 outputs captured images 44.

The color filters 41 are filters that transmit red, green and blue lights, respectively, and each one of the three kinds of filters being formed for each pixel of the image sensor 43. A combination of the red, green and blue filters constitutes one unit.

The optical lens unit 42 is configured with a lens that condenses light, for example, a focus lens, a zoom lens and the like to shoot a subject. The focus lens is a lens that forms a subject image on the light receiving surface of the image sensor 43. The zoom lens is a lens that causes a focal length to freely change in a predetermined range. The optical lens unit 42 is provided with a peripheral circuit that adjusts setting parameters for focus, exposure, white balance and the like as necessary.

The image sensor 43 is configured with a photoelectric conversion element, an AFE (analog front end) and the like. The photoelectric conversion element is configured, for example, a CMOS (complementary metal oxide semiconductor) type photoelectric conversion element or the like. A subject image is incident to the photoelectric conversion element from the optical lens unit 42. Then, the photoelectric conversion element performs photoelectric conversion (imaging) of the subject image to accumulate an image signal for a predetermined time, and sequentially supplies the accumulated image signal to the AFE as an analog signal. The AFE executes various kinds of signal processing, such as A/D (analog/digital) conversion processing, for the analog image signal. A digital signal is generated by the various kinds of signal processing, and is outputted as an output signal of the imaging apparatus 4. Such an output signal of the imaging apparatus 4 is hereinafter referred to as "a captured image". The data of the captured image is appropriately supplied to the CPU 51 and the like.

Figure 4:
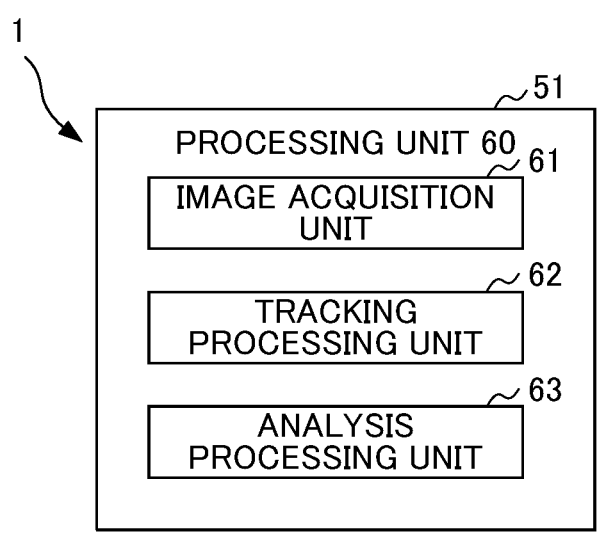
FIG. 4 is a functional block diagram showing a functional configuration for a CPU of the image processing apparatus of FIG. 1 to execute a control process.

Next, a processing unit 60 realized by the CPU 51 of the image processing apparatus 5 will be described with reference to FIG. 4. The processing unit 60 can be also referred to as a processor. The processing unit 60 has an image acquisition unit 61, a tracking processing unit 62 and an analysis processing unit 63.

The image acquisition unit 61 acquires images 44 captured by the imaging apparatus 4. The imaging apparatus 4 has an imager, for example, in FHD (full high definition; 1920×1080 pixels) and shoots, for example, thirty images 44 per second. The image acquisition unit 61 acquires digital information about the images 44 from the imaging apparatus 4.

In the images 44 acquired by the image acquisition unit 61, the tracking processing unit 62 identifies a bright spot 45 that is continuously lit up, especially, a green bright spot 45G that is continuously lit up. For example, the tracking processing unit 62 extracts only a signal in green sub-pixels in the images 44, and finds such pixels in which the green signal continuously exceeds a predetermined threshold. Then, the tracking processing unit 62 tracks the green bright spot 45G that continuously changes its position in the images 44 and identifies the position thereof in each image 44. As the position, the tracking processing unit 62 identifies, for example, the corresponding pixel position in each image 44. In the example of FIG. 1, for example, the position of the bright spot 45 of the forklift with the ID 101 at the upper left is identified to be the position of a pixel which is the 280-th in the X direction and the 590-th in the Y direction.

The analysis processing unit 63 analyzes the blinking or flickering pattern of the infrared LED 30 that is blinking or flickering at the same position as the green bright spot 45G extracted by the tracking processing unit 62, and identifies, for example, an identification number (ID, Identification) of the LED transmission apparatus 2.

Figure 5:
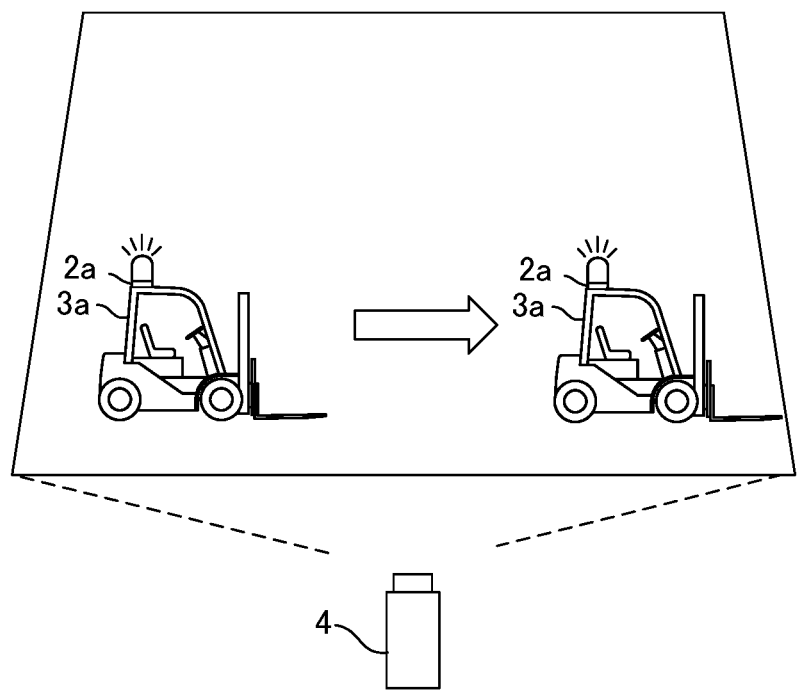
FIG. 5 is a schematic diagram showing that the imaging apparatus shoots movement of a movable body of FIG. 1.

Here, description will be made on an example of movement of a movable body 3 and an example of an optical signal received by the imaging apparatus 4 and the image processing apparatus 5, using FIGS. 5 to 9. As shown in FIG. 5, the imaging apparatus 4 is shooting the movable body 3 moving from left to right. The LED transmission apparatus 2 of the movable body 3 continuously lights up the visible light LED 29, and causes the infrared LED 30 to blink or flicker.

By using a green LED as the visible light LED 29 that is continuously lit up, it becomes easy to grasp change in infrared light. In the image sensor 43 using the normal color filters 41, an infrared cut filter is used. The image sensor 43 according to the one embodiment of the present disclosure does not use an infrared cut filter or uses a filter with a low infrared cutting ability. In this case, any image sensor 43 that receives light that has passed through each of the color filters 41 of red, green and blue reacts to infrared light. Normally, for white balancing, outputs of blue and red are amplified in comparison with green with a high received light intensity.

Since there is no difference in the received light intensity for infrared light among red, green and blue, blue and red signals the outputs of which are amplified are relatively stronger, and the infrared light brings about an output signal of color like purple. Therefore, for example, when infrared light is received at the same time as green light, the whole color becomes color close to white. When green is lit up, and there is no infrared light, the color is green. When green is continuously lit up, and infrared light is blinking or flickering, white and green blinking or flickering is caused. Therefore, the combination of green and infrared light enables decoding processing of simple color transition (white and green) and brings about excellent robustness. Since a transmitter does not emit red or blue light in this state, only continuous lighting of "green" is seen to human eyes without flickering. Therefore, discomfort is reduced.

Figure 6:
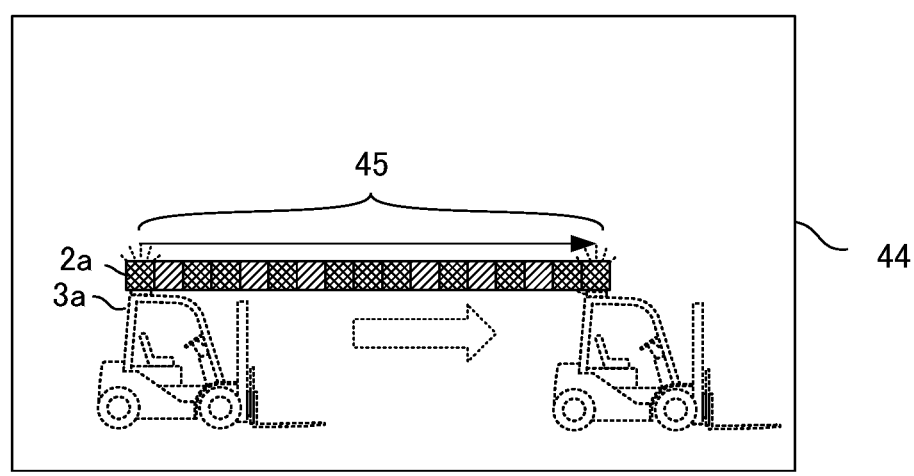
FIG. 6 is a diagram showing an example of an image that shows movement of bright spots of an LED of the movable body of FIG. 5.
Figure 7:
FIG. 7 is a diagram showing especially the state of color of a green bright spot among the bright spots of FIG. 6 in the image.
Figure 8:
FIG. 8 is a diagram showing especially the state of color of an infrared bright spot among the bright spots of FIG. 6 in the image.
Figure 9:
FIG. 9 is a diagram showing the state of color of the bright spots of FIG. 6 in the image.

The visible light LED 29 that is continuously lit up and the blinking or flickering infrared LED 30 are shown in the images 44 as the trajectory of the bright spot 45 as shown in FIG. 6. The visible light LED 29 is, for example, green, recognized as the green bright spot 45G, and continuously lit up during movement as shown in FIG. 7. In FIG. 7, lines diagonal from right to left are drawn on the bright spots 45G on the images to indicate that they are the bright spot 45G. The infrared LED 30 is caused to be blinking or flickering as shown in FIG. 8, and recognized as purple by the imaging apparatus 4 as described above. In FIG. 8, lines diagonal from left to right are drawn on the infrared bright spots 45P on the images to indicate that they are the infrared bright spot 45P. The above bright spots are combined. As shown in FIG. 9, a white bright spot 45W is recognized when the green visible light LED 29 and the infrared LED 30 are lit up, and, when the infrared LED 30 is lit out, the green bright spot 45G is recognized because the green visible light LED 29 is continuously lit up. In FIG. 9, both of the lines diagonal from right to left and the lines diagonal from left to right are drawn to indicate the white bright spot 45W. As shown in FIG. 9, the bright spot 45 is recognized as the bright spot 45 that is blinking or flickering between the green bright spot 45G and the white bright spot 45W.

Next, description will be made on a process from acquisition of images 44 by the imaging apparatus 4 to identification of the movable bodies 3 and grasp of positions on the images 44 with reference to FIGS. 10 and 11. An outline will be described in FIG. 10, and details related to decoding processing of the images 44 will be described in FIG. 11.

Figure 10:
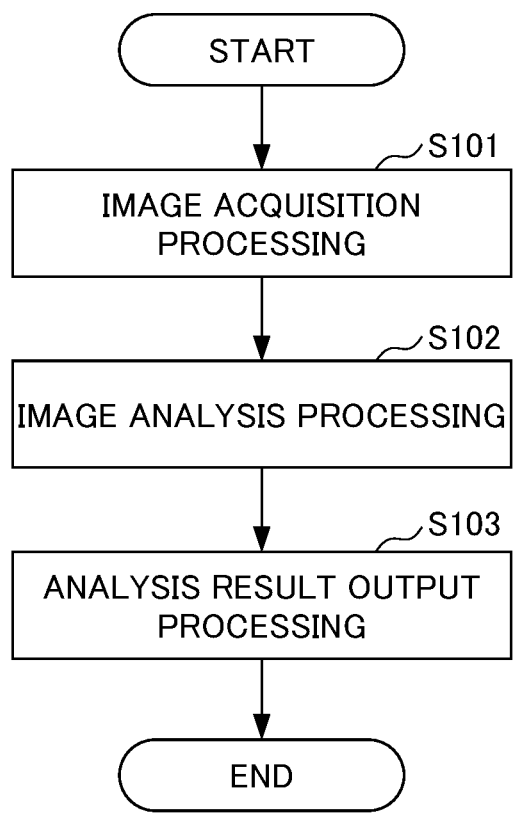
FIG. 10 is a flowchart illustrating an outline of image processing executed by the image processing apparatus of the present embodiment.
Figure 11:
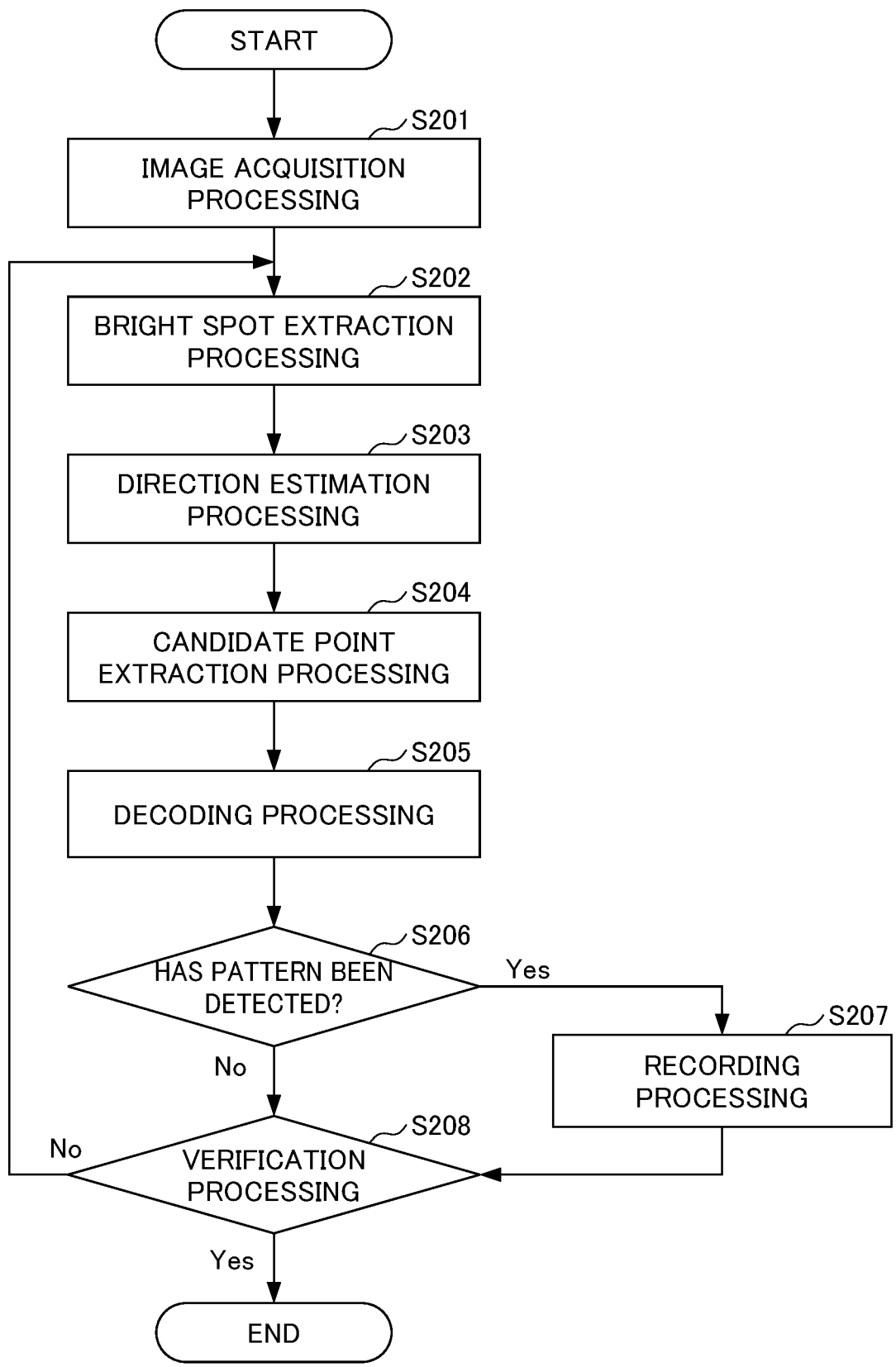
FIG. 11 is a flowchart illustrating details of the image processing executed by the image processing apparatus of the present embodiment, mainly about decoding.

As shown in FIG. 10, when the optical communication system 1 starts, the image acquisition unit 61 of the image processing apparatus 5 acquires images 44 shot by the imaging apparatus 4 (step S101).

Next, the tracking processing unit 62 performs image analysis processing for extracting bright spots 45 of continuously lit-up visible light in the images 44, more specifically, green bright spots 45G and identifying positions in the images 44 (step S102). In parallel, the analysis processing unit 63 performs image analysis processing for clarifying information, more specifically, the identification numbers of the movable bodies 3 associated with the bright spots 45, from blinking or flickering patterns of infrared bright spots 45P blinking or flickering at the same positions as the green bright spots 45G (step S102). If the identification numbers for the bright spots 45 are clarified once, it is not necessary to newly acquire identification numbers from the blinking or flickering patterns of the infrared bright spots 45P as far as the continuously lit-up green bright spots 45G are tracked.

Next, the analysis processing unit 63 performs analysis result output processing for outputting an analysis result to the work management apparatus 6 through the output unit 55 of the image processing apparatus 5 (step S103) and ends the process (step END).

Description will be made in more detail with reference to FIG. 11. The image acquisition unit 61 of the image processing apparatus 5 performs image acquisition processing for acquiring an image 44 corresponding to one frame from video that is continuously shot (step S201). Next, the tracking processing unit 62 performs bright-spot-45 extraction processing for extracting bright spots 45 having green components (step S202) and performs direction estimation processing for estimating movement directions of the movable bodies 3 from movement histories of the bright spots 45 (step S203).

After step S203, the tracking processing unit 62 performs candidate point extraction processing for weighting the movement directions, extracting neighboring bright spots 45 having green components within a specified movement range as candidate points and tracking movement of green bright spot 45G (step S204). Since lights of the visible light LEDs 29 are shown as bright spots 45 that are relatively bright on the imager, it is possible to considerably narrow down the bright spots 45 only by capturing a relatively dark image.

After step S204, the tracking processing unit 62 narrows down the candidate points thought to be points where optical communication is performed, by performing shape filtering, and completes the candidate point extraction processing (step S204).

Furthermore, the analysis processing unit 63 performs decoding processing using infrared light change histories at bright spot positions (step S205). The image sensor 43 recognizes infrared light as purple as described above. Therefore, in the image 44, the infrared light change history is a history of change between green and white obtained by mixture of green and purple. When white is recognized, infrared light is emitted.

The analysis processing unit 63 performs pattern detection processing for trying to detect effective light emission patterns from a decoding result (step S206). If the effective light emission patterns are detected (step S206: Yes), the analysis processing unit 63 performs storage processing for storing the IDs of the movable bodies 3 and positions of the movable bodies 3 in the screen into the storage unit 56 from the effective light emission patterns (step S207).

If the effective light emission patterns cannot be detected from the decoding result in the detection processing (step S206: No) or after the storage processing (step S207) has been performed, verification processing for verifying whether the pattern checking for all the bright spots 45 has been completed (step S208). If the pattern checking has not been completed (step S208: No), the process returns to the bright spot extraction processing for extracting bright spots 45 having green components (step S202). If the pattern checking for all the bright spots 45 has been completed, the process flow ends (step END).

As described above, the image processing apparatus 5 is provided with the processing unit 60 that acquires images 44 that are continuous over time, acquires positions of the visible light LEDs 29 in the continuous images 44 as position of the movable bodies 3, acquires infrared lights of the infrared LEDs 30 provided on the movable bodies 3 and acquires pieces of information based on the infrared lights.

Thereby, it is possible to obtain the image processing apparatus 5 realizing optical communication that is excellent in tracking without giving discomfort of blinking of the visible light LEDs 29. In optical communication using a common camera, communication of information is performed using blinking of a white LED. However, the number of timings of the LED being lit out increases, it is difficult to track the LED. By adopting a format of causing the infrared LEDs 30 to freely blink or flicker while ensuring tracking of movements of the LED transmission apparatuses 2 by causing the visible light LEDs 29 to be continuously lit up, it is possible to ensure tracking while keeping the coding rate high. The blinking or flickering infrared lights of the infrared LEDs 30 do not cause discomfort because it is invisible to humans.

The image processing apparatus 5 is provided with the single image sensor 43 that acquires visible lights of the visible light LEDs 29 and infrared lights of the infrared LEDs 30.

Thereby, images of the visible light LEDs 29 and images of the infrared LEDs 30 are projected on the single image sensor 43. The images of the visible light LEDs 29 and the images of the infrared LEDs 30 can be arranged in the same images 44. The visible light LEDs 29 can be associated with the infrared LEDs 30, respectively.

The processing unit 60 of the image processing apparatus 5 tracks positions of the green visible light LEDs 29 that are continuously lit up or flickering as positions of the movable bodies 3, and acquires blinking patterns of infrared lights in infrared regions of the infrared LEDs 30.

Since highly sensitive green of the imaging apparatus 4 is used thereby, excellent visibility is realized. Further, when light is received by the imaging apparatus 4 together with infrared light, a green signal is suppressed by a white balance adjustment circuit, and white is judged as a whole. Binary blinking or flickering of white and green is realized, and analysis becomes easy and highly reliable.

The visible light LEDs 29 and the infrared LEDs 30 are provided near the movable bodies 3, respectively, or provided mutually closely, respectively.

Visible light from each visible light LED 29 and infrared light from each infrared LED 30 can be received by the same pixels on the image sensor 43. The infrared light from each infrared LED 30 is received by each of red, green and blue sub-pixels to issue a signal. The infrared light from each infrared LED 30 gives color like visible light. A signal based on the infrared light and a signal based on the visible light are mixed, and a color signal of pixels configured with red, green and blue is created.

The processing unit 60 of the image processing apparatus 5 judges, if detecting emission of single color light represented by green at a target position, that only the visible light LED 29 is lit up between the visible light LED 29 and the infrared LED 30, and judges, if detecting white light emission at a target position, that both of the visible light LED 29 and the infrared LED 30 are lit up.

Thereby, the visible light LED 29 is judged to be continuously lit up, and it becomes easy to track the position. Further, blinking or flickering of the infrared LED 30 is extracted, and it is possible to obtain highly accurate information by analyzing the blinking or flickering pattern.

The LED transmission apparatus 2 is an LED transmission apparatus 2 for optical communication that is mounted on each movable body 3 and is provided with the visible light LED 29 that is lighting-controlled to acquire a position of the movable body 3, and an invisible light source arranged on the movable body 3 and controlled to be lit up to transmit identification information corresponding to the movable body 3, for example, the infrared LED 30.

Thereby, by lights from the visible light LED 29 and the infrared LED 30 being received by the imaging apparatus 4, the identification number and position of the movable body 3 mounted with the LED transmission apparatus 2 are identified. Thus, optical communication that is excellent in tracking of a moving light source without giving discomfort of blinking can be realized. In optical communication using a common camera, communication of information is performed using blinking of a white light source. However, the number of timings of the light source being lit out increases, it is difficult to track the light source. By adopting a format of causing the infrared light sources to freely blink or flicker while ensuring tracking of movements of the movable bodies 3 by causing the visible light LEDs 29 to be continuously lit up, it is possible to ensure tracking while keeping the coding rate high. The blinking or flickering infrared lights of the infrared line sources do not cause discomfort because the infrared lights are invisible to humans.

The optical communication system 1 is provided with: the LED transmission apparatuses 2 including: the visible light LEDs 29 that are lighting-controlled to acquire positions of the movable bodies 3, respectively; and the infrared LEDs 30 that are arranged on the movable bodies 3, respectively, and controlled to be lit up to transmit pieces of information corresponding to the movable bodies 3; and the image processing apparatus 5 including the processing unit 60, the processing unit 60 acquiring the images 44 that are continuous over time, acquiring positions of the visible light LEDs 29 in the continuous images 44, as the positions of the movable bodies 3; acquiring infrared lights of the infrared LEDs 30; and acquiring pieces of information based on the infrared lights.

Thereby, it is possible to realize the optical communication system 1 realizing optical communication that is excellent in tracking without giving discomfort of blinking of the visible light LEDs 29.

The program causes the image processing apparatus 5 to execute: an image acquisition function of acquiring images 44 that are continuous over time; an acquisition processing function of acquiring positions of the visible light LEDs 29 in the continuous images 44, as positions of the movable bodies 3; and an analysis processing function of acquiring infrared lights of the infrared LEDs 30 provided on the movable bodies 3 and acquiring pieces of information based on the infrared lights.

Thereby, it is possible to realize a program realizing optical communication that is excellent in tracking without giving discomfort of blinking of the visible light LEDs 29.

The image processing method is an image processing method executed by the image processing apparatus 5, the image processing method including: an image acquisition step of acquiring images 44 that are continuous over time; an acquisition processing step of acquiring positions of the visible light LEDs 29 in the continuous images 44 as positions of the movable bodies 3; and an analysis processing step of acquiring infrared lights of the infrared LEDs 30 provided on the movable bodies 3 and acquiring pieces of information based on the infrared lights.

Thereby, it is possible to realize an image processing method realizing optical communication that is excellent in tracking without giving discomfort of blinking of the visible light LEDs 29.

It should be noted that the embodiment described above is not intended to limit the present disclosure, and the present disclosure encompasses modifications, improvements and the like within a range where the object of the present disclosure can be achieved.

For example, as for the visible light LEDs 29, visible light LEDs 29 that emit color other than green may be adopted. For example, red visible light LEDs 29, which are also intended to call attention, may be used as the visible light LEDs 29. In this case, in the imaging apparatus 4, signals may be adjusted by an amplification circuit of the imaging apparatus 4, an arithmetic circuit of the image processing apparatus 5 or the like so that, for each LED transmission apparatus 2, white is recognized when both of the infrared LED 30 and the red visible light LED 29 are lit up as described above. In this case, at the stage of analysis processing by the image processing apparatus 5, the blinking or flickering pattern is blinking or flickering of white and red.

As the invisible light, not infrared light but ultraviolet light may be used. The ultraviolet is also invisible to humans, blinking thereof does not cause discomfort, and it is possible to obtain information from a blinking or flickering pattern. In this case, in the imaging apparatus 4, signals may be adjusted by the amplification circuit of the imaging apparatus 4, the arithmetic circuit of the image processing apparatus 5 or the like so that, for each LED transmission apparatus 2, white is recognized when both of the green visible light LED 29 and the ultraviolet light are lit up. In this case, at the stage of the analysis processing by the image processing apparatus 5, the blinking or flickering pattern is blinking or flickering of white and green.

In communication of information, not blinking of infrared light but change in the wavelength of infrared light may be used. Since the sensitivity of the imaging apparatus 4 depends on the wavelength of infrared light, change in the wavelength of infrared light is recognized as change in the intensity of a received signal, or difference in the intensity of the received signal among red, green and blue sub-pixels, that is, difference in color.

Description has been made so far on the embodiment in which the visible light LEDs 29 are continuously lit up. The visible light LEDs 29 may have a state of being flickering that can be tracked without discomfort, that is, a state of being normally lit up and appropriately lit out. In this case also, an effect similar to the effect of the visible light LEDs 29 in the continuously lit-up state that stable tracking without discomfort is possible is obtained.

Further, in the above embodiment, the imaging apparatus 4 to which the present disclosure is applied has been described with a digital camera as an example, but the present disclosure is not limited thereto. Further, though the imaging apparatus 4 and the image processing apparatus 5 have been described as independent apparatuses, a configuration is also possible in which the image processing apparatus 5 is included in the imaging apparatus 4.

Further, in each diagram, a single functional block may be configured with a single piece of hardware, a single installation of software, or a combination thereof. In other words, the functional configuration of FIG. 4 is merely an illustrative example, and the present disclosure is not particularly limited thereto. More specifically, the types of functional blocks employed to realize the above-described functions are not particularly limited to the examples shown in FIG. 4, so long as the image processing apparatus 5 is provided with the functions enabling the aforementioned series of processes sequence to be executed in its entirety.

The series of processes described above can be executed by hardware, and can also be executed by software. In the case of having the series of processes executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be configured with a removable medium separately from an apparatus main body to supply the program to a user, but a storage medium or the like supplied to the user in a state incorporated in the apparatus main body in advance is also included. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) disc or the like. The magnetic optical disk is composed of an MD (Mini-Disk) or the like. The storage medium supplied to the user in a state of being incorporated in the apparatus main body in advance is configured with, for example, the ROM 22 in FIG. 2, the hard disk included in the storage unit 56 in FIG. 3 or the like, in which the program is recorded.

It should be noted that, in the present specification, the steps defining the program recorded in the storage medium include not only the processing executed in a time series following this order, but also processing executed in parallel or individually, which is not necessarily executed in a time series.

What is claimed is:

1. An image processing apparatus comprising:
a processor configured to:
acquire a plurality of images that are continuous over time;
acquire, as a position of a movable body, a position of a visible light source in a lit-up state that is provided on the movable body in the plurality of images; and
acquire identification information of the movable body based on a blinking pattern of an invisible light source in the plurality of images,
wherein the blinking pattern of the invisible light source is detected from an image region at a substantially same position as the position of the visible light source, and
wherein a first time period of emitting visible light with the visible light source includes a second time period of emitting the invisible light with the blinking pattern so that the processor can judge both of the position and the identification information of the movable body.

2. The image processing apparatus according to claim 1, comprising a single image sensor configured to acquire visible light of the visible light source and invisible light of the invisible light source.

3. The image processing apparatus according to claim 1, wherein the processor is configured to:

track, as a position of the movable body, the position of the visible light source in green in a state of being continuously lit up or in a state of being lit up for a predetermined period; and
acquire the identification information about the movable body by acquiring the blinking pattern of invisible light in an infrared region of the invisible light source.

4. The image processing apparatus according to claim 1, wherein each of the visible light source and the invisible light source is provided to move with the movable body.

5. The image processing apparatus according to claim 4, wherein the processor is configured to:
judge, in a case in which a green light emission is detected, that only the visible light source is lit up between the visible light source and the invisible light source; and
judge, in a case in which a white light emission is detected, that both of the visible light source and the invisible light source are lit up.

6. An optical transmission apparatus comprising:
a visible light source that is lit up to acquire a position of a movable body; and
an invisible light source that is lit up to transmit identification information of the movable body,
wherein a first time period of emitting visible light with the visible light source includes a second time period of emitting the invisible light with a blinking pattern so that both of the position and the identification information of the movable body can be judged,
wherein the blinking pattern is detected from an image region at a substantially same position as the position of the visible light source.

7. An optical communication system comprising:
an optical transmission apparatus and an image processing apparatus,
the optical transmission apparatus comprising:
a visible light source configured to be lit up; and
an invisible light source configured to be lit up; and
the image processing apparatus comprising a processor configured to:
acquire a plurality of images that are continuous over time;
acquire, as a position of a movable body, a position of the visible light source in a lit-up state in the plurality of continuous images; and
acquire identification information of the movable body based on a blinking pattern of invisible light in the plurality of images,
wherein the blinking pattern is detected from an image region at a substantially same position as the position of the visible light source, and
wherein a first time period of emitting visible light with the visible light source includes a second time period of emitting the invisible light with the blinking pattern so that the processor can judge both of the position and the identification information of the movable body.

8. A non-transitory computer-readable storage medium storing a program that is executed by a computer to perform operations comprising:
acquiring a plurality of images that are continuous over time;
acquiring, as a position of a movable body, a position of a visible light source in a lit-up state that is provided on the movable body in the plurality of images; and acquiring identification information of the movable body based on a blinking pattern of an invisible light source in the plurality of images, wherein the blinking pattern of the invisible light source is detected from an image region at a substantially same position as the position of the visible light source, and wherein a first time period of emitting visible light with the visible light source includes a second time period of emitting the invisible light with the blinking pattern so that program causes the computer to judge both of the position and the identification information of the movable body.

9. An image processing method executed by a computer comprising a processor, the image processing method comprising:

acquiring a plurality of images that are continuous over time;

acquiring, as a position of a movable body, a position of a visible light source in a lit-up state that is provided on the movable body in the plurality of images; and acquiring identification information of the movable body based on a blinking pattern of an invisible light source in the plurality of images, wherein the blinking pattern of the invisible light source is detected from an image region at a substantially same position as the position of the visible light source, and wherein a first time period of emitting visible light with the visible light source includes a second time period of emitting the invisible light with the blinking pattern so that the processor can judge both of the position and the identification information of the movable body.

* * * * *